July 3, 1962

C. J. KENNEDY 3,042,819

DIFFERENTIAL COUNTING SYSTEM

Filed Sept. 30, 1959

INVENTOR.
CHARLES J. KENNEDY
BY
ATTORNEY

July 3, 1962
C. J. KENNEDY
3,042,819
DIFFERENTIAL COUNTING SYSTEM
Filed Sept. 30, 1959
2 Sheets-Sheet 2
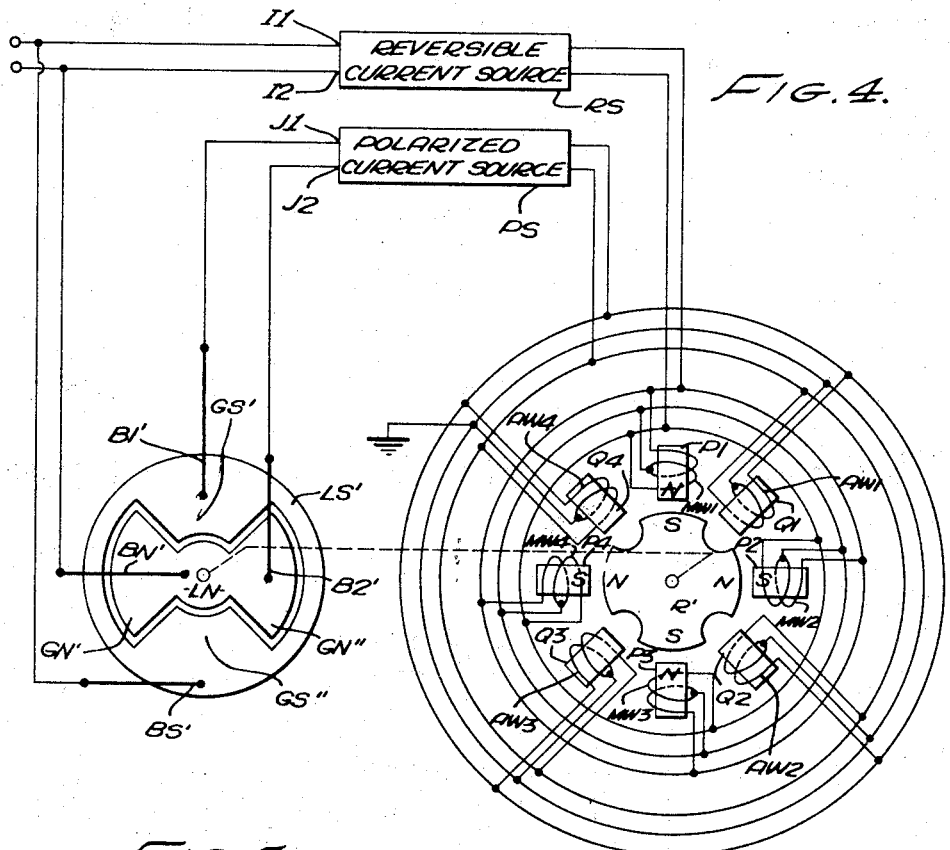
FIG. 4.
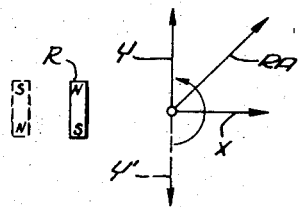
FIG. 3a.
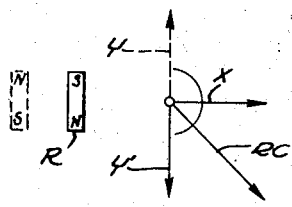
FIG. 3c.
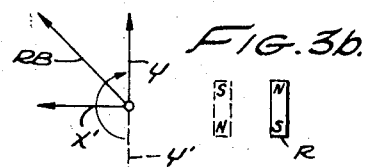
FIG. 3b.
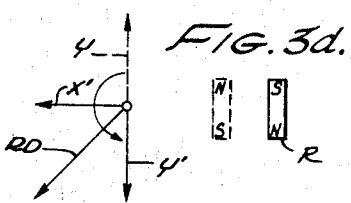
FIG. 3d.
INVENTOR.
CHARLES J. KENNEDY
BY
ATTORNEY United States Patent Office 3,042,819
Patented July 3, 1962

3,042,819
DIFFERENTIAL COUNTING SYSTEM
Charles J. Kennedy, Pasadena, Calif., assignor to Endevco Corporation, Pasadena, Calif., a corporation of California
Filed Sept. 30, 1959, Ser. No. 843,500
10 Claims. (Cl. 310—49)

This invention relates to improvements in rotary stepping systems and more particularly to an improved pulse-actuated stepper motor system operated by pulses from two different sources and designed to produce a net angular rotation in accordance with the difference between the numbers of pulses supplied from the two sources during the same period of time.

In various rotary stepper systems now employed, the rotor of a motor is stepped in one direction or another through a fixed angle each time a pulse is applied to an input circuit, depending upon which of two sources supplies the pulse. In such a system, each step of the rotor in one direction counts a pulse from one source, while each step in the opposite direction counts a pulse from another source. As a result, in such a system, the number of steps in one direction or the other represents the difference in the numbers of pulses received from the two sources.

Heretofore complex circuitry has been required to cause the rotor to step in one direction or the other, depending upon the source from which the pulse is received. Such complex circuitry has been required because of the need for the circuit to "remember" the recent history of events occurring at its input.

This invention is based upon a concept that represents a basic departure from the concepts heretofore employed in stepping systems. According to this invention, a commutator switch driven by the rotor is employed to operate the motor in accordance with the recent prior history of events applied to the input. In its simplest embodiment, this invention employs a phase-wound stator having a main winding and an auxiliary winding, a reversible current source connected to the main winding, and a polarized current source connected to the quadrature winding. Electrical brushes or contacts associated with commutator segments apply currents to the polarized current source simultaneously with the application of pulses to the reversible current source in such a way as to step the motor in the proper direction according to the input current source from which the pulse is received. The manner in which the correct direction of rotation is established is explained hereinafter in connection with the description of two embodiments of the invention. At the same time, the principles underlying the invention are described in order to enable one skilled in the art to apply the invention in other ways.

More particularly, the invention is described hereinafter with reference to its application to a two-pole stepper motor and a four-pole stepper motor, the entire system being illustrated and described with reference to the accompanying figures in which—

FIGS. 3a, 3b, 3c and 3d are vector diagrams employed in explaining the operation of the system; and FIG. 4 is a block diagram of a four-pole embodiment of the invention.

Figure 1:
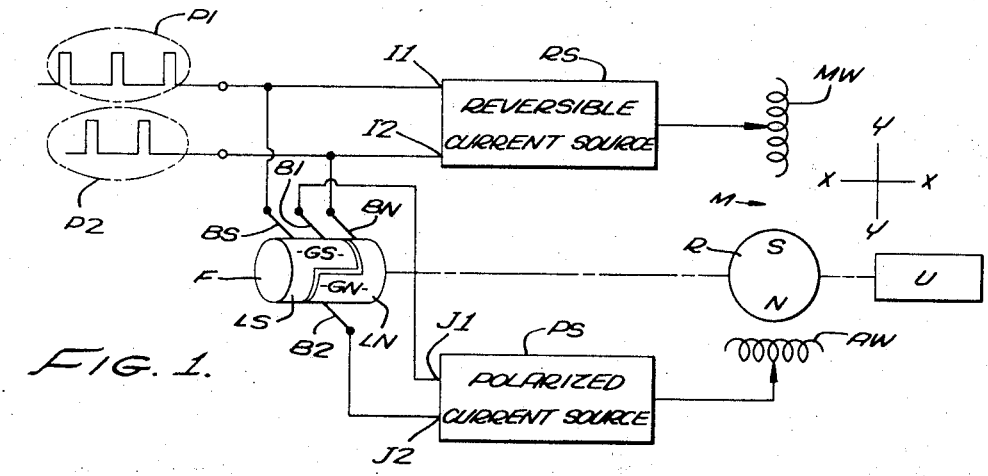
FIG. 1 is a block diagram of a two-pole embodiment of the invention.
Figure 2:
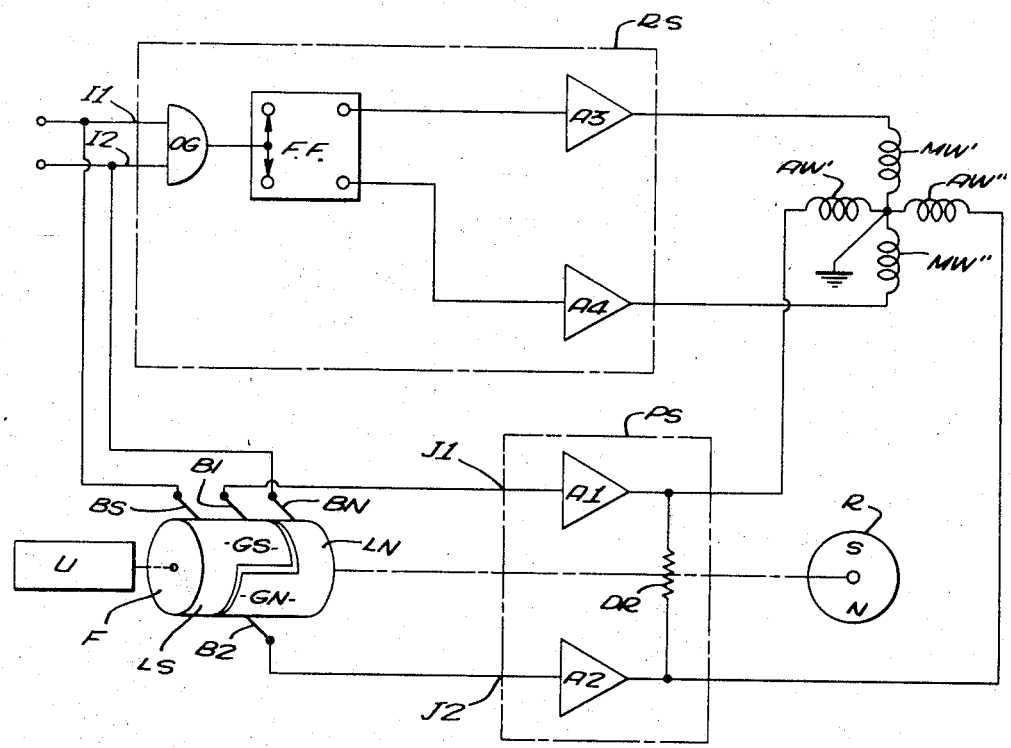
FIG. 2 is a schematic diagram of the two-pole arrangement.

Referring to the drawings and more particularly FIGS. 1 and 2, there is illustrated a stepper motor system embodying the features of the present invention and including a two-pole stepper motor M, a utilization unit U and control circuitry, including a reversible current source RS and a polarized current source PS. The motor M is stepped by an angle of 180° in one direction or another each time a pulse is applied from one or another pulse source P1 or P2, causing a signal or indication or movement of the utilization unit U to change in a linear manner by an amount proportional to the difference in the number of pulses received from the two pulse sources P1 and P2 over a given interval of time. The utilization unit U may be a counter for counting the difference in the number of pulses, or it may be a device which is controlled in accordance with the amount of angular rotation of the motor M.

The motor M, while used for stepping rather than for continuous rotation, may be in the form of a two-pole synchronous motor having a phase-wound stator and a salient-pole rotor. The stator has two windings, a main winding MW and an auxiliary winding AW arranged 90° from each other. When current from the reversible current source RS flows through the main winding MW, a magnetic field is applied along the polar axis Y—Y, the direction of magnetization depending upon the direction of flow of the current through the main winding. In a similar way, when current flows through the auxiliary winding AW, a magnetic field component is produced along the inter-polar, or quadrature, axis X—X, the direction of the field depending upon the direction of flow of current through the auxiliary winding. The rotor R is permanently magnetized, though it could be magnetized by the application of current from an armature wound upon it. In either event, the north and south poles N and S are located in fixed positions on the rotor.

As a result, while no current is applied to the auxiliary winding AW, the rotor R assumes one or another of two stationary positions along the polar axis, depending upon the direction of flow of current through the main winding MW. When the direction of the current is reversed through the main winding MW, the rotor, if not on "dead center," rotates through an angle 180° to the other position. In accordance with this invention, a mechanical switching device in the form of a commutator and slip-ring arrangement is employed to apply current of such a polarity to the quadrature winding AW that the rotor rotates in the proper direction in accordance with the source P1 and P2 which causes the reversal of current through the main winding MW.

More particularly, in the case of a two-pole motor, a commutator is employed that has two 180° segments GN and GS arranged on the periphery of the shaft F of the rotor R. The two commutator segments GS and GN are in electrical communication with corresponding slip rings LS and LN that are also mounted on the shaft F. Two stationary electrical brushes or contacts B1 and B2 are mounted at the positions assumed by the centers of the commutator segments GS and GN respectively when the rotor R is in one or the other of its stationary positions. The two brushes B1 and B2 are connected to the polarized current source PS in order to cause current to flow through the quadrature winding AW in one direction or the other when a voltage of predetermined polarity, such as a positive voltage, is applied to one brush or the other. Two additional brushes BS and BN, which are in contact with the two slip rings LS and LN respectively, are connected to the upper and lower input terminals I1 and I2 respectively of the reversible current source RS.

Each commutator segment GS or GN and its corresponding slip ring LS or LN constitutes a rotary switch element. The entire arrangement of switch elements and brushes constitutes in effect a two-pole double-throw switch.

The reversible current source RS is of a type which produces a D.C. current in its output which is reversed in direction each time a pulse is applied to either of its inputs I1 or I2. Thus each time a pulse is applied to either input I1 or I2, the direction of flow of current through the main winding MW is reversed. On the other hand, the direction of flow of current through the quadrature winding AW depends upon the input J1 or J2 of the polarized current source PS to which voltage is applied. As a result, the rotor R rotates in a proper direction each time a pulse is applied from either the input source P1 or the input source P2. The manner in which the correct rotation of the rotor is produced is explained below with reference to the graphs shown in FIGS. 3a, 3b, 3c and 3d.

To illustrate the operation, assume for simplicity that the direction of the magnetic field produced by current flowing in either the winding MW or the auxiliary winding AW has a direction in FIG. 1 which is the same as the direction in which the current flows through the winding. In other words, when the current flows in a positive direction through the main winding MW, that is from the lower end of the winding to the upper end of the winding, a magnetic field is produced in the space in which the rotor is mounted, in a positive direction, as represented by the vectors Y of FIG. 3a, 3b, 3c and 3d. Conversely, when the current flows in a negative direction through the main winding MW, that is from the upper end of the winding to the lower end of the winding, a magnetic field is produced in the space in which the rotor is mounted, in a negative direction, as represented by the two vectors Y' of FIGS. 3a, 3b, 3c and 3d. Similarly, when the current flows in a positive direction through the auxiliary winding AW, that is from the left end of the winding to the right end of the winding, a magnetic field is produced in the space in which the rotor is mounted, in a positive direction, as represented by the two vectors X of FIGS. 3a, 3b, 3c, and 3d. Conversely, when the current flows in a negative direction through the auxiliary winding AW, that is from the right end of the winding to the left end of the winding, a magnetic field is produced in the space in which the rotor is mounted, in a negative position, as represented by the two vectors X' of FIGS. 3a, 3b, 3c and 3d.

In FIGS. 3a, 3b, 3c and 3d the rotor R is represented schematically as a permanent bar magnet. In these figures the componet of the magnetic field being produced in the main winding MW just prior to the application of a pulse from either source P1 or P2 is shown in phantom, while the component of the magnetic field produced by the main winding MW and auxiliary winding AW at the time of application of such a pulse are shown by the vertical and horizontal solid lines. In the latter case, the resultant magnetic field produced by the components are represented by the vectors RA, RB, RC and RD respectively. In all cases, the orientation of the rotor R just prior to the application of the pulse is shown in phantom. More particularly, while the rotor is in a rest position when the magnetic field produced by the stator is directed upwardly in the rotor space, the north and south poles of the rotor are at the upper and lower ends respectively of the rotor space. And while the rotor is in a rest position when the magnetic field produced by the stator is directed downwardly in the rotor space, the north and south poles of the rotor are at the lower and upper ends respectively of the rotor space.

It is apparent, of course, that in the absence of current through the quadrature winding, the direction of rotation of the rotor that occurs when the stator field is reversed is somewhat uncertain and random in character, depending upon the exact location at which the rotor has last come to rest and upon other minor uncontrolled factors. But with currents properly applied to the quadrature winding, the rotor can be forced to rotate in the proper direction.

Let it be assumed by way of example that initially the rotor R is in the position indicated in phantom in FIGS. 3a and 3b in which current is flowing downwardly in the main winding MW and in which the north and south ends of the rotor R are at the lower and upper ends respectively. Assume further that in this initial condition, no pulse is being applied to either of the inputs I1 or I2 of the reversible current source RS. Under these conditions, no current is flowing through the auxiliary winding AW and the commutator segment GS is in contact with upper brush B1 and the commutator segment GN is in contact with the lower brush B2.

Now when a pulse is applied from the source P1 to the upper input terminal I1 of the reversible current source RS, the current through the main winding MW reverses, causing the magnetic field in the rotor space to change from the negative direction to the positive direction, reversing the magnetic field from the position shown in phantom Y' in FIGS. 3a and 3b to the new position shown in solid-line Y in FIGS. 3a and 3b. At the same time, the pulse is applied through the brush BS and slip ring LS and through the commutator segment GS and the upper commutator brush B1 to the upper input terminal J1 of the polarized current source PS, causing current to flow from the left end to the right end of the auxiliary winding AW, thus producing a biasing magnetic field that is directed to the right in the rotor space as indicated by the symbol X of FIG. 3a. As a result, a resultant magnetic field RA that lies between the magnetic field component Y and the magnetic field component X of FIG. 3a is produced in the rotor space. Since this resultant magnetic field lies in a direction which is in a clockwise position relative to the magnetic field component Y produced by the stator, the rotor R rotates in a counterclockwise direction toward alignment with the magnetic field RA. But since, as explained hereinafter, the pulse is terminated after rotation of the rotor R in the counterclockwise direction has been initiated, the rotor continues in the counterclockwise direction, coming to rest with its north and south poles in the upper and lower positions respectively as shown by the solid lines of FIG. 3a.

If, instead of being applied from source P1 to the upper input terminal I1, a pulse is applied from the source P2 to the lower input terminal I2 of the reversible current source RS, the rotation is in a clockwise direction. In this case, when the pulse is applied, the current through the main winding MW again reverses, causing the magnetic field to change from the negative direction to the positive direction, reversing the magnetic field from the position Y1 shown in phantom in FIGS. 3a and 3b to the new position shown in solid line in FIGS. 3a and 3b. This time, however, the pulse is applied through the brush BN and slip ring LN and through the commutator segment GN and the lower commutator brush B2 to the lower input terminal J2 of the polarized current source PS, causing current to flow from the right end to the left end of the auxiliary winding AW, thus producing a biasing magnetic field that is directed to the left in the rotor space as indicated by the symbol X' of FIG. 3b. As a result, a resultant magnetic field RB that lies between the magnetic field component Y and the magnetic field component X' of FIG. 3b is produced in the rotor space. Since this resultant magnetic field lies in a direction which is in a counter-clockwise position relative to the magnetic field component Y produced by the stator, the rotor R rotates in a clockwise direction toward alignment with the magnetic field RB. Since, the pulse is terminated after rotation of the rotor in the clockwise direction has been initiated, the rotor continues in the clockwise direction, finally coming to rest with its north and south poles in the upper and lower positions as shown by the solid lines of FIG. 3b.

Now, however, let it be assumed that initially the rotor is in the position indicated in phantom in FIGS. 3c and 3d in which current is flowing upwardly in the main winding MW and in which the north and south ends of the rotor R are at the upper and lower ends respectively. Assume, as before, that in this initial condition, no pulse is being applied to either of the inputs I1 or I2 of the reversible current source RS. Under these conditions, no current is flowing through the auxiliary winding and the commutator segment GN is in contact with upper brush B1 and the contact segment GS is in contact with the lower brush B2.

In this case, when a pulse is applied from the source P1 to the upper input terminal I1 of the reversible current source RS, the current through the main winding MW reverses, causing the magnetic field to change from the positive direction to the negative direction, reversing the magnetic field from the position Y shown in phantom in FIGS. 3c and 3d to the new position Y' shown in solid-line in FIGS. 3c and 3d. At the same time, the pulse is applied through the brush BS and slip ring LS and through the commutator segment GS and the lower commutator brush B2 to the lower input terminal J2 of the polarized current source PS, causing current to flow from the right end to the left end of the auxiliary winding AW, thus producing a biasing magnetic field component that is directed to the left in the rotor space as indicated by the symbol X' of FIG. 3d. As a result, a resultant magnetic field RD that lies between the magnetic field component Y' and the magnetic field component X' of FIG. 3d is produced in the rotor space. Since this resultant magnetic field lies in a direction which is in a clockwise position relative to the magnetic field component Y' produced by the stator, the rotor R rotates in a counter-clockwise direction toward alignment with the magnetic field RD. In this case, the rotor continues in the counter-clockwise direction, coming to rest with its north and south poles in the lower and upper positions respectively as shown by the solid lines of FIG. 3d.

But if a pulse is applied from source P2 instead of from source P1, the rotation is in a clockwise direction. In this case, when the pulse is applied, the current through the main winding MW reverses, causing the magnetic field to change from the positive direction to the negative direction, reversing the magnetic field from the position Y shown in phantom in FIGS. 3c and 3d to the new position Y' shown in solid-line in FIGS. 3c and 3d. At the same time, however, the pulse is applied through the brush BN and slip ring LN and through the commutator segment GN and the upper commutator brush B1 to the upper input terminal J1 of the polarized current source PS, causing current to flow from the left end to the right end of the auxiliary winding AW, thus producing a biasing magnetic field component that is directed to the right in the rotor space as indicated by the symbol X of FIG. 3c. As a result, a resultant magnetic field RC that lies between the magnetic field component Y' and the magnetic field component X of FIG. 3c is produced in the rotor space. Since this resultant magnetic field lies in a direction which is in a counter-clockwise position relative to the magnetic field component Y' produced by the stator, the rotor R rotates in a clockwise direction toward alignment with the magnetic field RD. In this case the rotor continues in the clockwise direction, finally coming to rest with its north and south poles in the lower and upper positions as shown by the solid lines of FIG. 3c.

From the foregoing explanation, it is seen that whenever a pulse is applied from the source P1, the rotor R rotates in a clockwise direction irrespective of whether its north pole is in its upper or its lower position. Likewise, it is seen that whenever a pulse is applied from the source P2, the rotor R rotates in a counter-clockwise direction irrespective of whether its north pole is in its upper of its lower position. Thus, each time a pulse is applied from source P1, the rotor is rotated clockwise through an angle of 180°, while each time a pulse is applied from source P2, the rotor is rotated counter-clockwise through an electrical angle of 180°. As a result, the total net angle turned by the rotor R in any time interval depends upon the number of pulses that have been applied to the system from the source P1 in excess of those applied from the source P2. The net rotation is clockwise if this excess is positive, but counter-clockwise if the excess is negative.

In practice, the pulses supplied by the sources P1 and P2 are of sufficient duration to enable the rotor to continue in the proper direction of rotation when the pulse is discontinued but short compared with the time required for the rotor to travel from one stationary position to another. Furthermore, a damping resistor DR is connected across the auxiliary winding to brake excessive continued rotation of the rotor past its desired stationary position. For this purpose, the durations of the pulses may be only a small fraction of the time required for the rotor R to turn to an angle of 90°.

It is to be noted that if the slip ring brushes BS and BN are connected to the polarized current source and the commutator brushes B1 and B2 are connected to the reversible current source, the same type of differential stepping action is obtained.

A specific arrangement for providing the desired action of the reversible current source RS and the polarized current source PS is illustrated in FIG. 2. The main winding MW comprises two sections MW' and MW" that are connected in series while the auxiliary winding consists of two winding sections AW' and AW", also connected in series. The junction between the two windings MW' and MW" and the junction between the two auxiliary winding sections AW' and AW" are connected to a common point of the power supply here indicated as ground. The polarized current source PS comprises two amplifiers A1 and A2 which have their outputs connected to the free ends of the auxiliary windings AW' and AW" respectively, and which have their inputs connected to the commutator brushes B1 and B2 respectively. With this arrangement, when a current pulse is applied to the commutator brush B1, a corresponding amplified current pulse is applied by the amplifier A1 to the winding AW' from left to right. When the current pulse is applied to the commutator brush B2, a corresponding amplified current pulse is applied by the amplifier A2 to the winding AW" from right to left.

The reversible current source RS includes an OR gate OG, a flipflop circuit FF, and two amplifiers A2 and A4. Two inputs of the OR gate OG form the inputs I1 and I2 of the reversible current source. The output of the OR gate OG is connected to the input of the flip-flop circuit FF. The two output terminals of the flipflop circuit are connected to the input circuits of the amplifiers A3 and A4 respectively. The output of the upper amplifier A3 is connected to the free end of the upper main winding section MW' and the output of the lower amplifier A4 is connected to the free end of the lower main winding section MW".

As is conventional, the voltage at each output terminal of the flipflop circuit is switched from a zero value to a positive value each time a pulse is applied, the voltage on one output terminal being positive and the voltage on the other terminal being zero at any one time. Each of the amplifiers A3 and A4 may be of a type which produces a positive current in its output whenever a positive voltage is applied to its input and no current in its output when zero voltage is applied to its input. In effect, whenever a pulse is applied, the polarity of the signals appearing at the outputs of the flipflop circuit are reversed, thus causing a current to flow in the output of one of the amplifiers A3 or A4 and to be cut off in the output of the other of these amplifiers.

With this arrangement, each time a pulse is applied to either of the inputs I1 or I2, a pulse appearing at the output of the OR gate OG is applied to the input of the flipflop circuit FF, causing the voltages at the outputs of the flipflop circuit to reverse in relative polarity and thus cause current to be cut off from one of the main winding sections MW′ and MW″ and to flow through the other. As a result, each time a new pulse is applied to either input I1 or I2, the magnetic field produced in the rotor space by the stator is reversed as explained above.

Thus, with the circuit of FIG. 2, appropriate reversals of the stator field and appropriate application of biasing field components are applied to cause the rotor to rotate 180° in a clockwise direction each time a pulse is applied to the upper input circuit I1 and in a counter-clockwise direction each time a pulse is applied to the upper input circuit I2.

By way of further illustration of the invention, there is shown in FIG. 4 a commutator and slip ring arrangement of the type that maye be employed with a four-pole motor. In this case, the commutator segment GS is replaced by two diametrically opposed commutator segments GS′ and GS″, while the commutator segment GN is replaced by two diametrically opposed commutator segments GN′ and GN″. Each of the commutator segments in this case occupies a geometrical angle of approximately 90° but still an electrical angle of 180° as in the case of the two-pole motor. The two brushes B1′ and B2′ are displaced from each other by a geometrical angle of 90°, but nevertheless an electrical angle of 180° as in the case of the two-pole motor.

In this case, there are four main magnetic poles P1, P2, P3 and P4 arranged at positions that are spaced 90° from each other in a plane along two mutually perpendicular polar axes. The two poles P1 and P3 are located on opposite sides of the motor along one axis and the two poles P2 and P4, the two axes being perpendicular to each other.

Though only two poles located 90° apart are needed, the four pole arrangement is described for simplicity.

In this case, four parallel-connected main split windings MW1, MW2, MW3 and MW4 are arranged on the four main poles P1, P2, P3 and P4 respectively. The main windings are connected to the output circuits of the reversible current source RS in a manner similar to the main split winding of FIG. 2. Four parallel-connected auxiliary split windings AW1, AW2, AW3 and AW4 are arranged on the four auxiliary poles Q1, Q2, Q3, and Q4 respectively. The auxiliary windings are connected to the output circuits of the polarized current source PS in a manner similar to the auxiliary split winding of FIG. 2.

With the four-pole arrangement illustrated in FIG. 4, the two opposite main poles P1 and P3 have the same polarity and the opposite main poles P2 and P4 have the same polarity, but the two first-mentioned poles are oppositely polarized from the later-mentioned poles. By way of illustration, when current is supplied in a particular direction to the main windings, from the reversible current source, each of the first-mentioned pair of opposite poles P1 and P3 is a north pole N, while each of the second pair of opposite poles P2 and P4 is a south pole S. And when the current is supplied from the reversible current source RS in the opposite direction, the polarity from the four main poles are reversed. In a similar manner, the two poles Q1 and Q3 have the same polarity, while the two opposite auxiliary poles Q2 and Q4 have the same polarity, but the polarity of the opposite two poles is opposite the polarity of the poles of the other pair.

In this case, the rotor is permanently magnetized, having two opposite north poles and two opposite south poles. The rotor, therefore, may assume any one of four stationary positions depending upon the polarities of the poles P1, P2, P3 and P4.

In this case, for any specific current flow from the reversible current source RS, the rotor may assume either one or two opposite positions. Furthermore, when a pulse is applied to either of the inputs I1 or I2 to the reversible current source RS, the rotor will rotate in one direction or another depending upon the position of the rotor at the time that the pulse is applied and also depending upon whether the pulse is applied to the upper input circuit I1 or the lower circuit I2.

With the arrangement described, each time a pulse is supplied to the upper input I1 of the reversible current source, the rotor R′ rotates in a clockwise direction by a geometrical angle of 90°, whereas when a pulse is applied to a lower output I2, the rotor R′ rotates in a counterclockwise direction by a geometrical angle of 90°. Thus, with a four-pole motor and with a two-pole motor, the net angle of rotation that occurs at any time interval represents the difference between the number of the pulses applied to the inputs I1 and I2. In both cases, the electrical angle stepped is 180° each time a pulse is applied. However, the geometrical angle varies inversely with the number of poles.

From the foregoing explanation of the invention, it will be understood that a simple stepper motor system has been provided which takes advantage of the fact that the segments of a commutator are moved from one position to another each time that the rotor is stepped and makes use of the position of the rotor to determine the polarity of the quadrature field required to rotate the rotor in a given direction when a pulse is next applied from a particular source. While the invention has been described only with reference to a two-pole and a four-pole motor, it will be understood that it may be applied when a larger number of poles are employed. Furthermore, the invention may be applied not only with an arrangement in which the commutator is attached to the rotor shaft, but also when it is driven by the rotor in other ways. It will be understood that the particular embodiments of the invention illustrated have been described with particularity merely to illustrate how the invention may be practiced. It is not intended that the invention be limited to the specific embodiments described, since to those skilled in the art it will be apparent that it may be embodied in many other forms in accordance with the principles described herein and within the scope of the appended claims.

I claim:

1. A stepping device comprising
  a motor having a stator unit and a magnetized rotor unit, said stator unit having main and auxiliary winding means thereon, said rotor unit having a series of stationary positions relative to said stator unit according to the polarity of current applied to said main winding means;
  a reversible current source connected to said main winding means;
  a first switch element comprising a first slip ring and a first commutator segment means, said first slip ring and said first commutator segment means being electrically connected;
  a second switch element comprising a second slip ring and a second commutator segment means, said second slip ring and said second commutator segment means being electrically connected;
  the two commutator segment means comprising the same number of commutator segments, commutator segments of the two commutator segment means being arranged alternately, said commutator segments being located in corresponding contact positions when said rotor unit is in the respective stationary positions;

a first pair of brushes contacting said two slip rings respectively;

a second pair of brushes contacting a commutator segment of each of said two commutator segment means respectively when said commutator segments are in said contact positions;

the brushes of one pair being connected to said winding means for applying a transverse biasing field to said rotor until when said rotor is in any of said stationary positions whereby said rotor tends to rotate in one direction or another according to the polarity of said biasing field and the position of said stator;

two signal input circuits connected to said other pair of bushes respectively for alternately receiving signal from two sources respectively, and means interconnecting said input circuits and said current source for reversing the current supplied to said main winding means each time a signal is received by said signal input sources.

2. A stepping device comprising
a motor having a stator unit having a main split winding and an auxiliary split winding thereon and a magnetic rotor unit, said rotor unit having a series of stationary positions relative to said stator unit according to the polarity of the field supplied by said stator;

a current source having two alternately active output circuits connected to the two halves of said main winding for alternately reversing the polarity of the field supplied by said stator when said current source is energized;

a first switch element comprising a first slip ring and a first commutator segment means, said first slip ring and said first commutator segment means being electrically connected;

a second switch element comprising a second slip ring and a second commutator segment means, said second slip ring and said second commutator segment means being electrically connected;

the two commutator segment means comprising the same number of commutator segments, commutator segments of the two commutator segment means being arranged alternately, said commutator segments being located in corresponding contact positions when said rotor unit is in the respective stationary positions;

a first pair of brushes contacting said two slip rings respectively;

a second pair of brushes contacting a commutator segment of each of said two commutator segment means respectively when said commutator segments are in said contact positions;

the brushes of one pair being connected to said winding means for applying a transverse biasing field to said rotor unit when said rotor is in any of said stationary positions whereby said rotor tends to rotate in one direction or another according to the polarity of said biasing field and the position of said stator;

two signal input circuits connected to said other pair of brushes respectively for receiving signals from two signal sources respectively; and means interconnecting said signal sources and said current source for energizing said current source each time a signal is received by said signal input circuits.

3. A stepping device comprising
a motor having a stator unit and a rotor unit, one of said units being magnetized and the other having winding means thereon, thereby establishing a series of stationary positions for said rotor unit relative to said stator unit according to the polarity of current applied to said winding means;

a first switch element comprising a first slip ring and a first commutator segment means, said first slip ring and said first commutator segment means being electrically connected;

a second switch element comprising a second slip ring and a second commutator segment means, said second slip ring and said second commutator segment means being electrically connected;

the two commutator segment means comprising the same number of commutator segments, commutator segments of the two commutator segment means being arranged alternately, said commutator segments being located in corresponding contact positions when said rotor unit is in the respective stationary positions;

a first pair of brushes contacting said two slip rings respectively; and a second pair of brushes contacting said two commutator segment means respectively when said commutator segments are in said contact positions;

the brushes of one pair being connected to said winding means for applying a transverse biasing field to said rotor unit when said rotor is in any of said stationary positions whereby said rotor tends to rotate in one direction or another according to the polarity of said biasing field and the position of said stator.

4. A stepping device comprising
a motor having a stator unit and a rotor unit, one of said units being magnetized and the other having a split winding means thereon, thereby establishing a series of stationary positions for said rotor unit relative to said stator unit according to the polarity of current applied to said winding means;

a first switch element comprising a first slip ring and a first commutator segment means, said first slip ring and said first commutator segment means being electrically connected;

a second switch element comprising a second slip ring and a second commutator segment means, said second slip ring and said second commutator segment means being electrically connected;

the two commutator segment means comprising the same number of commutator segments, commutator segments of the two commutator segment means being arranged alternatively, said commutator segments being located in corresponding contact positions when said rotor unit is in the respective stationary positions;

a first pair of brushes contacting said two slip rings respectively; and a second pair of brushes contacting a commutator segment of each of said two commutator segment means respectively when said commutator segments are in said contact positions;

the two brushes of one pair being connected to supply current to different halves of said split winding for applying a transverse biasing field to said rotor unit when said rotor is in any of said stationary positions whereby said rotor tends to rotate in one direction or another according to the polarity of said biasing field and the position of said stator.

5. In a stepping device:
a motor having a stator unit and a rotor unit, one of said units being magnetized and the other having winding means thereon, thereby establishing a series of stationary positions for said rotor unit relative to said stator unit according to the polarity of a D.C. current applied to said winding means;

a pair of switch means comprising alternate segments of a commutator having a number of segments corresponding in number to said stationary positions and adapted to be located in corresponding contact positions when said rotor unit is in the respective stationary positions;

and brushes located in said contact positions and connected to said winding means for applying a transverse biasing field to said rotor when in any of said stationary positions whereby said rotor tends to rotate in one direction or another according to the polarity of said biasing field and the position of said stator.

6. In a stepping device comprising
a motor having a stator unit and a rotor unit, one of said units being magnetized and the other having winding means thereon, thereby establishing a series of stationary positions for said rotor unit relative to said stator unit according to the polarity of current applied to said winding means,
a commutator and a pair of slip rings driven by said rotor, said commutator having a plurality of commutator segments corresponding in number to said stationary positions and adapted to be located in corresponding contact positions when said rotor unit is in the respective stationary positions, the two slip rings being connected respectively to alternate commutator segments,
a first pair of brushes located in said contact positions, a second pair of brushes in contact with said slip rings, one pair of said brushes being connected to said winding means for applying a transverse biasing field to said rotor when in any of said stationary positions whereby said rotor tends to rotate in one direction or another according to the position of said stator and which brush of the other pair receives current.

7. A stepping device comprising
a motor including a stator unit having a main and auxiliary winding means angularly displaced from each other and also including a magnetized rotor that is rotatable relative to said stator, said rotor normally resting in any one of a series of stationary angular positions relative to said stator according to the polarity of direct current applied to said main winding means,
a reversible current source connected to said main winding means,
a commutator and a pair of slip rings driven by said rotor, said commutator having a plurality of commutator segments corresponding in number to said stationary positions and adapted to be located in corresponding contact positions when said rotor is in the respective stationary positions,
a first pair brush means located in alternate stationary contact positions,
a second pair of brush means in contact with the respective slip rings,
a pair of circuit means connecting to one pair of brush means respectively to said auxiliary winding means for applying transverse biasing fields in opposite directions to said rotor according to which of said circuit means is energized,
a pair of signal input circuits connected to said other pair of brush means respectively for alternately receiving signals from two signal sources respectively, and means interconnecting said signal sources and said current source for reversing the current supplied to said main winding means each time a signal is received from signal sources.

8. A stepping device comprising
a motor including a stator unit having a main winding means and a quadrature winding means and also including a magnetized rotor that is rotatable relative to said stator, said rotor normally resting along a polar axis in a direction depending upon the polarity of current flowing through said main winding means,
a reversible current source connected to said main winding means;
a commutator having a plurality of commutator segments equal in number to the number of positions assumable by said stator in which said stator may rest, said segments being arranged in pairs and driven by said stator so as to be located in corresponding contact positions when said rotor is in the respective stationary positions, said segments forming two switch elements with one segment of each pair forming part of one switch element or the other,
first and second brush means whereby different brush means contact different switch elements when said rotor is in any one of its stationary positions; means connecting said brush means to said auxiliary winding to cause a current to flow therethrough in one direction or the other according to which of said brush means receives an electric signal;
means for applying current pulses to one of said brush means when said rotor is in any one of said set of alternate positions; and
means for reversing the current supplied by said reversible current source each time a pulse is supplied to one or the other of said brush means.

9. A stepping device comprising
a motor having a stator unit and a rotor unit, one of said units being magnetized and the other having main and auxiliary winding means thereon, the first winding means establishing a series of stationary positions for said rotor unit relative to said stator unit, the rotor unit being in any one of a first set of alternate positions when current of one polarity is applied to said main winding means and in any one of the remaining set of alternate stationary positions when current of the opposite polarity is applied to said main winding means;
means including a flip-flop circuit means having two stable states for supplying current of one polarity or the opposite polarity to said main winding means;
an OR gate having two input circuits and an output circuit, said OR gate changing said flip-flop circuit means from one stable condition to the other when a signal is applied to either input of said OR gate;
a commutator and a pair of slip rings driven by said rotor, said commutator having two alternate commutator-segment switch elements;
first brush means associated with said commutator-segment switch elements for applying current to said auxiliary winding in a first direction or a second direction according to the position of said stator unit when a signal is applied to one input circuit of said OR gate;
second brush means associated with said commutator-segment means for applying current to said auxiliary winding in said second direction or said first direction according to the position of said stator unit when a signal is applied to the second input circuit of said other OR gate.

10. A stepping device comprising
a motor having a stator unit and a rotor unit, one of said units being magnetized and the other having main and auxiliary winding means thereon, the main winding means establishing a series of stationary positions for said rotor unit relative to said stator unit, the rotor unit being any one of a first set of alternate positions when current of one polarity is applied to said main winding means and in any one of the remaining set of alternate stationary positions when current of the opposite polarity is applied to said main winding means;
means including a flip-flop circuit means having two stable states for supplying current of one polarity or the opposite polarity to said main winding means;
an OR gate signal for changing said flip-flop circuit from one stable condition to the other when a signal is applied to either input of said OR gate;
a commutator and a pair of slip rings driven by said rotor, said commutator having two alternate commutator segment switch elements;
a first pair of brushes contacting said two slip rings respectively;
a second pair of brushes contacting a commutator segment of each of said two commutator segment means respectively when said rotor is in one of said stationary positions;

the brushes of one pair being connected to said auxiliary winding means for applying a transverse biasing field to said rotor unit when said rotor is in any of said stationary positions whereby said rotor tends to rotate in one direction or another according to the polarity of said biasing field and the position of said stator;

said two signal input circuits connected to the other pair of brushes respectively for alternately receiving signals from two signal circuits respectively.

References Cited in the file of this patent
UNITED STATES PATENTS
2,706,270   Steele ------------------ Apr. 12, 1955